US008095745B1

(12) United States Patent
Schmidt et al.

(10) Patent No.: US 8,095,745 B1
(45) Date of Patent: Jan. 10, 2012

(54) NON-SEQUENTIAL TRANSFER OF DATA FROM A MEMORY

(75) Inventors: William R. Schmidt, Boise, ID (US); Douglas G. Keithley, Boise, ID (US); Gordon R. Clark, Meridian, ID (US)

(73) Assignee: Marvell International Ltd. (BM)

( * ) Notice: Subject to any disclaimer, the term of this patent is extended or adjusted under 35 U.S.C. 154(b) by 748 days.

(21) Appl. No.: 11/890,407

(22) Filed: Aug. 6, 2007

Related U.S. Application Data

(60) Provisional application No. 60/821,658, filed on Aug. 7, 2006.

(51) Int. Cl.
*G06F 12/00* (2006.01)
(52) U.S. Cl. ........................................................ 711/154
(58) Field of Classification Search .................. None
See application file for complete search history.

(56) References Cited

U.S. PATENT DOCUMENTS

| | | | | |
|---|---|---|---|---|
| 5,745,497 A * | 4/1998 | Ben-Efraim et al. | ......... | 714/702 |
| 5,928,371 A * | 7/1999 | Robinson et al. | ............. | 714/702 |
| 6,125,421 A * | 9/2000 | Roy | .................................. | 711/5 |
| 6,457,095 B1 * | 9/2002 | Volk | ............................... | 711/105 |
| 6,687,860 B1 * | 2/2004 | Iijima et al. | .................... | 714/718 |
| 7,082,075 B2 * | 7/2006 | Skidmore | ................ | 365/230.03 |
| 2004/0019737 A1 * | 1/2004 | Kastoriano et al. | ........... | 711/104 |
| 2004/0236920 A1 * | 11/2004 | Sheaffer | ........................ | 711/165 |
| 2007/0280027 A1 * | 12/2007 | Skidmore | ................ | 365/230.01 |
| 2009/0193202 A1 * | 7/2009 | Ware et al. | ..................... | 711/154 |

\* cited by examiner

*Primary Examiner* — Brian Peugh

(57) ABSTRACT

The disclosed embodiments relate to a memory controller for retrieving a plurality of data stored in a memory in communication with the memory controller, the plurality of data being characterized by a first arrangement of first and second non-parallel arrays, such as one-dimensional arrays. The first array comprises at least first and second data of the plurality of data and the second array comprises at least the first data and third data of the plurality of data. The memory is operative to provide the at least first and second data of the first array before providing at least the third data of the second array when the memory is accessed based on an address of the first data in the memory and an amount of the plurality of data to provide starting from the address of the first data. The memory controller includes an address receiver operative to receive the address of the first data and a request generator in communication with the address receiver and the memory and operative to cause, based on the received address, the memory to provide the at least first data and third data of the second array before providing at least the second data of the first array.

32 Claims, 9 Drawing Sheets

| Block Column: | 0 | 1 | 2 | 3 | 4 | ... | n |
|---|---|---|---|---|---|---|---|
| Row: 0 | Blk (0n+0) 0 1 2 3 4 5 ... w | Blk (0n+1) 0 1 2 3 4 5 ... w | Blk (0n+2) 0 1 2 3 4 5 ... w | Blk (0n+3) 0 1 2 3 4 5 ... w | Blk (0n+4) 0 1 2 3 4 5 ... w | ... | Blk (0n+n) 0 1 2 3 4 5 ... w |
| 1 | Blk (1n+0) 0 1 2 3 4 5 ... w | Blk (1n+1) 0 1 2 3 4 5 ... w | Blk (1n+2) 0 1 2 3 4 5 ... w | Blk (1n+3) 0 1 2 3 4 5 ... w | Blk (1n+4) 0 1 2 3 4 5 ... w | ... | Blk (1n+n) 0 1 2 3 4 5 ... w |
| 2 | Blk (2n+0) 0 1 2 3 4 5 ... w | Blk (2n+1) 0 1 2 3 4 5 ... w | Blk (2n+2) 0 1 2 3 4 5 ... w | Blk (2n+3) 0 1 2 3 4 5 ... w | Blk (2n+4) 0 1 2 3 4 5 ... w | ... | Blk (2n+n) 0 1 2 3 4 5 ... w |
| ... | | | | | | | |
| X | Blk (Xn+0) 0 1 2 3 4 5 ... w | Blk (Xn+1) 0 1 2 3 4 5 ... w | Blk (Xn+2) 0 1 2 3 4 5 ... w | Blk (Xn+3) 0 1 2 3 4 5 ... w | Blk (Xn+4) 0 1 2 3 4 5 ... w | ... | Blk (Xn+n) 0 1 2 3 4 5 ... w |
| X+1 | Blk ((X+1)n+0) 0 1 2 3 4 5 ... w | Blk ((X+1)n+1) 0 1 2 3 4 5 ... w | Blk ((X+1)n+2) 0 1 2 3 4 5 ... w | Blk ((X+1)n+3) 0 1 2 3 4 5 ... w | Blk ((X+1)n+4) 0 1 2 3 4 5 ... w | ... | Blk ((X+1)n+n) 0 1 2 3 4 5 ... w |
| X+2 | Blk ((X+2)n+0) 0 1 2 3 4 5 ... w | Blk ((X+2)n+1) 0 1 2 3 4 5 ... w | Blk ((X+2)n+2) 0 1 2 3 4 5 ... w | Blk ((X+2)n+3) 0 1 2 3 4 5 ... w | Blk ((X+2)n+4) 0 1 2 3 4 5 ... w | ... | Blk ((X+2)n+n) 0 1 2 3 4 5 ... w |

| Address | Data | |
|---|---|---|
| 0 | Blk (0n+0) 1 | Blk (0n+0) 0 |
| 1 | Blk (0n+0) 3 | Blk (0n+0) 2 |
| 2 | Blk (0n+0) 5 | Blk (0n+0) 4 |
| 3 | Blk (0n+0) 7 | Blk (0n+0) 6 |
| 4 | Blk (1n+0) 1 | Blk (1n+0) 0 |
| 5 | Blk (1n+0) 3 | Blk (1n+0) 2 |
| 6 | Blk (1n+0) 5 | Blk (1n+0) 4 |
| 7 | Blk (1n+0) 7 | Blk (1n+0) 6 |
| 8 | Blk (2n+0) 1 | Blk (2n+0) 0 |
| 9 | Blk (2n+0) 3 | Blk (2n+0) 2 |
| A | Blk (2n+0) 5 | Blk (2n+0) 4 |
| B | Blk (2n+0) 7 | Blk (2n+0) 6 |

| Address | Byte Enable | Data |
|---------|-------------|------|
| 0 | 01 | Blk (0n+0) (0) |
| 4 | 01 | Blk (1n+0) (0) |
| 8 | 01 | Blk (2n+0) (0) |
| 0 | 10 | Blk (0n+0) (1) |
| 4 | 10 | Blk (1n+0) (1) |
| 8 | 10 | Blk (2n+0) (1) |
| 1 | 01 | Blk (0n+0) (2) |
| 5 | 01 | Blk (1n+0) (2) |
| 9 | 01 | Blk (2n+0) (2) |
| 1 | 10 | Blk (0n+0) (3) |
| 5 | 10 | Blk (1n+0) (3) |
| 9 | 10 | Blk (2n+0) (3) |
| 2 | 01 | Blk (0n+0) (4) |
| 6 | 01 | Blk (1n+0) (4) |
| A | 01 | Blk (2n+0) (4) |
| 2 | 10 | Blk (0n+0) (5) |
| 6 | 10 | Blk (1n+0) (5) |
| A | 10 | Blk (2n+0) (5) |
| 3 | 01 | Blk (0n+0) (6) |
| 7 | 01 | Blk (1n+0) (6) |
| B | 01 | Blk (2n+0) (6) |
| 3 | 10 | Blk (0n+0) (7) |
| 7 | 10 | Blk (1n+0) (7) |
| B | 10 | Blk (2n+0) (7) |

802 — Address
804 — Byte Enable
806 — Data
306, 308, 310

_US 8,095,745 B1_

NON-SEQUENTIAL TRANSFER OF DATA FROM A MEMORY

REFERENCE TO RELATED APPLICATIONS

This application claims the benefit of the filing date under 35 U.S.C. §119(e) of U.S. Provisional Application Ser. No. 60/821,658 filed Aug. 7, 2006, which is hereby incorporated by reference.

BACKGROUND

In a computer system, Direct Memory Access ("DMA") typically refers to the use of a memory controller, independent of the computer's main processor, to control the reading and writing of data to/from the computer's main memory by other devices connected therewith. DMA is a capability provided by the computer's bus architecture that allows data to be sent directly, rather than via the main processor, between an attached data device (such as a disk drive, scanner, video processor, printer, etc.) and the main memory of the computer.

In systems without DMA functionality, memory accesses, such as a request for data to be retrieved from a disk drive and stored in the main memory, are controlled, regulated and monitored by the main processor. However, such involvement of the main processor reduces the amount of resources that are available for other processing tasks and generally reduces overall system performance. By providing DMA functionality, the responsibility for monitoring and controlling memory accesses can be offloaded from the main processor thereby freeing up those resources that would otherwise be consumed and improving overall performance.

The DMA controller is typically connected, via a data and/or address/control bus, between the memory and the data devices which need to read data from or write data to the memory, referred to as data devices, and is further connected with the main processor or other devices which make requests for such transfers of data, referred to as requestors. A requestor may also be a data device that is requesting that data be transferred between it and the memory, or the requestor and the data device may be separate devices.

Data transfers, as controlled by the DMA functionality, are typically structured and/or optimized so as to efficiently take advantage of the logical and physical arrangement and constraints of the computer system's memory architecture. For example, the amount of data transferred in a given operation is typically constrained to a portion sized as a multiple of the size of the computer's data bus so as to efficiently utilize the bandwidth provided thereby. However, these optimizations may result in tradeoffs with respect to the needs of the devices that request data from the memory via the DMA functionality. Accordingly, it would be desirable to provide DMA functionality which is capable of efficiently addressing specific needs of specific requestors.

SUMMARY

The present invention is defined by the following claims, and nothing in this section should be taken as a limitation on those claims. By way of introduction, the disclosed embodiments described below relate to a memory controller for retrieving a plurality of data stored in a memory in communication with the memory controller, the plurality of data being characterized by a first arrangement of first and second non-parallel arrays, the first array comprising at least first and second data of the plurality of data, the second array comprising at least the first data and third data of the plurality of data. The memory controller includes: a memory interface in communication with a memory wherein the at least first and second data are stored in consecutively addressed locations in the memory and the first and third data are stored in non-consecutively addressed locations in the memory, the memory being operative to provide the at least first and second data of the first array before providing at least the third data of the second array when the memory is accessed based on an address of the first data in the memory and an amount of the plurality of data to provide starting from the address of the first data; an address receiver operative to receive the address of the first data and amount of the plurality of data to provide starting from the address of the first data; and a request generator in communication with the address receiver and the memory and operative to access the memory based on the address of the first data in the memory and the amount of the plurality of data to provide starting from the address of the first data and cause the memory to provide the at least first data and third data of the second array before providing at least the second data of the first array.

The disclosed embodiments further relate to a system for retrieving a plurality of data stored in a memory means, the plurality of data being characterized by a first arrangement of first and second non-parallel arrays, the first array comprising at least first and second data of the plurality of data, the second array comprising at least the first data and third data of the plurality of data. The system includes: means for interfacing with a memory having stored therein the at least first and second data in consecutively addressed locations in the memory and the first and third data in non-consecutively addressed locations in the memory, the memory being operative to provide the at least first and second data of the first array before providing at least the third data of the second array when the memory is accessed based on an address of the first data in the memory and an amount of the plurality of data to provide starting from the address of the first data; means for receiving the address of the first data and an amount of the plurality of data to provide starting from the address of the first data; and means for accessing the memory based on the address of the first data in the memory and the amount of the plurality of data to provide starting from the address of the first data and causing the memory to provide the at least first data and third data of the second array before providing at least the second data of the first array.

The disclosed embodiments further relate to a direct memory access controller including: a memory interface operative to cause a memory to provide at least a subset of a plurality of data stored in the memory to a requestor; a requestor interface operative to receive a request from the requestor for a consecutively addressed subset of the plurality of data stored in the memory to be provided in a non-consecutive order; and an address generator in communication with the requestor interface and the memory interface and, based on the request, operative to sequentially generate non-consecutive addresses of the requested subset of the plurality of data to cause the memory to provide the requested subset of the plurality of data to the requestor in the requested order.

The disclosed embodiments further relate to a direct memory access controller comprising a processor and a memory coupled with the processor, the direct memory access controller further including: first logic stored in the memory and executable by the processor to cause a memory to provide at least a subset of a plurality of data stored in the memory to a requestor; second logic stored in the memory and executable by the processor to receive a request from the requestor for a consecutively addressed subset of the plurality of data stored in the memory to be provided in a non-consecutive order; and third logic stored in the memory in communication with the first and second logic and executable by the processor to, based on the request, cause the memory to sequentially provide the requested consecutively addressed subset of the plurality of data to the requestor in the requested non-consecutive order.

The disclosed embodiments further relate to a method of retrieving a plurality of data stored in a memory, the plurality of data being characterized by a first arrangement of first and second non-parallel arrays, the first array comprising at least first and second data of the plurality of data, the second array comprising at least the first data and third data of the plurality of data. In one embodiment, the method includes: providing a memory wherein the at least first and second data are stored in consecutively addressed locations in the memory and the first and third data are stored in non-consecutively addressed locations in the memory, the memory being operative to provide the at least first and second data of the first array before providing at least the third data of the second array when the memory is accessed based on an address of the first data in the memory and an amount of the plurality of data to provide starting from the address of the first data; receiving the address of the first data; and causing, based on the received address, the memory to provide the at least first data and third data of the second array before providing at least the second data of the first array when the memory is accessed based on an address of the first data in the memory and an amount of the plurality of data to provide starting from the address of the first data.

The disclosed embodiments further relate to a method of causing a consecutively addressed memory to sequentially provide a plurality of data non-consecutively stored therein, the method including: receiving a request for the plurality of data, the request including a first address of a first data of the plurality of data; and providing, sequentially to the memory, each non-consecutive address of each of the plurality of data, beginning with the first address, to cause the sequential provision thereof by the memory.

The disclosed embodiments further relate to a consecutively addressed memory operative to store a plurality of data arranged as a plurality of rows and columns, the data of each of the plurality of rows being consecutively stored in the consecutively addressed memory, a method of causing the consecutively addressed memory to provide the data of at least one column of the plurality of data, wherein the disclosed method includes: providing, sequentially to the memory, each non-consecutive address of each of the data of the at least one column to cause the sequential provision thereof by the memory prior to the data of at least one other column.

Further aspects and advantages of the invention are discussed below in conjunction with the preferred embodiments.

BRIEF DESCRIPTION OF THE DRAWINGS

FIG. 3 depicts an exemplary memory for use with the controller of FIG. 1.

FIG. 7 depicts an exemplary arrangement of the subset of FIG. 4 as stored in a memory.

FIG. 8 depicts one ordering of the retrieval of the data shown in FIG. 4 from the memory by the controller of FIG. 2.

DETAILED DESCRIPTION

By way of introduction, the disclosed embodiments relate to a DMA controller which interfaces between a memory and a requestor which reads from the memory. The memory is operative to store data, characterized by a row and column arrangement, in an array of storage locations and provide the stored data to the requestor in a row by row ordering. Where the requestor desires the data to be provided in a column by column ordering, the DMA controller of the disclosed embodiments is operative to cause the memory to instead provide the data in the desired column by column ordering, thereby eliminating the need for the requestor to reorder the data.

Figure 1:
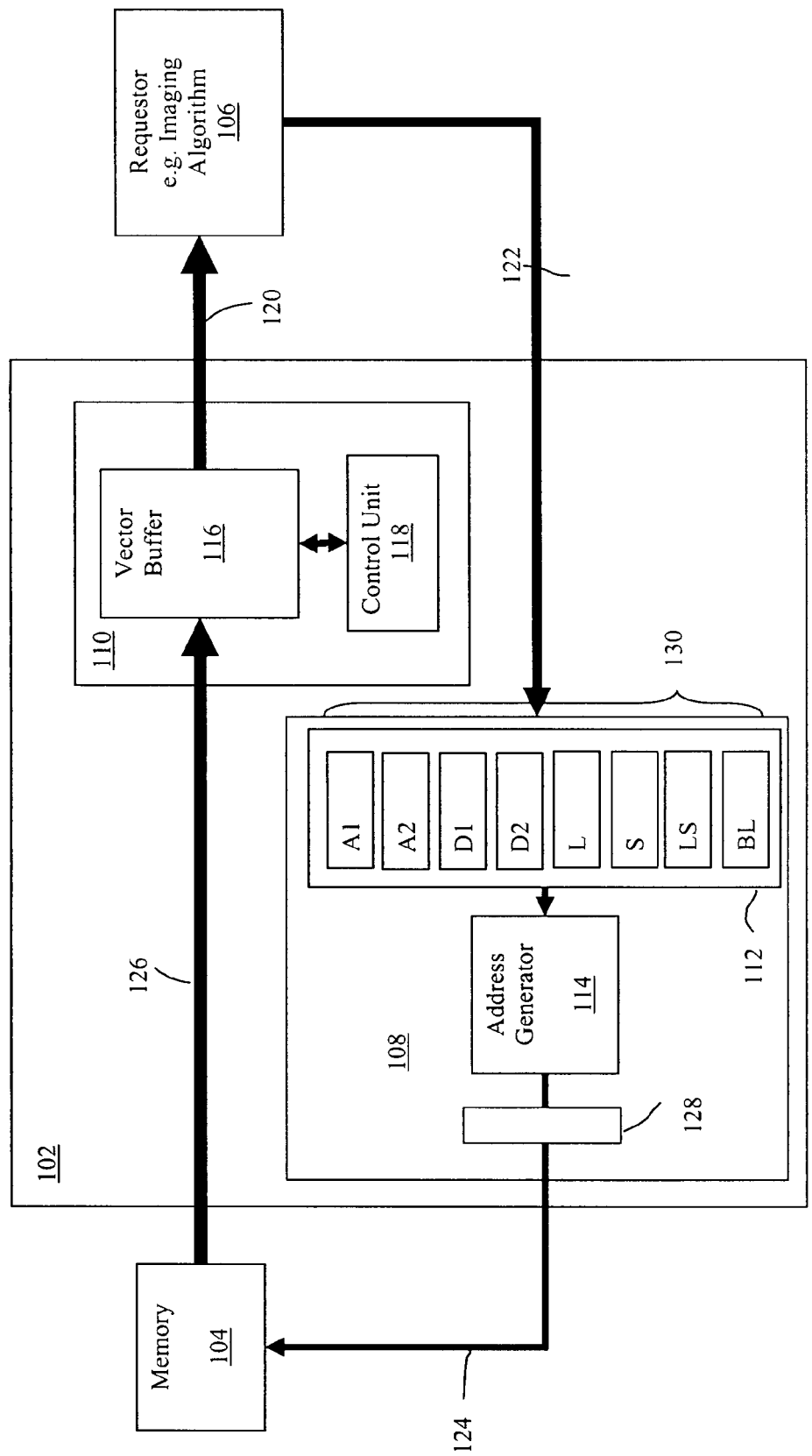
FIG. 1 depicts a block diagram of an exemplary system having a direct memory access controller according to one embodiment.

FIG. 1 shows a block diagram of an exemplary system 100, such as a personal computer, workstation, printer, personal digital assistant, cellular "smart" phone, embedded system, etc., having a Direct Memory Access ("DMA") controller 102 according to the disclosed embodiments. The system 100 includes a memory 104 in communication with the DMA controller 102, and a requestor/data device 106, referred to herein as a requestor 106, also in communication with the DMA controller 102. It will be appreciated that the system 100 may include more than one DMA controller 102, memory 104 and/or requestor 106. Herein, the phrase "in communication with" is defined to mean directly connected to or indirectly connected through one or more intermediate components. Such intermediate components may include both hardware and software based components. In one embodiment, the requestor 106 is further in communication with the memory 104 via the DMA controller 102, such as via a data bus 120 and an address/control bus 122. Alternatively, the requestor 106 may be directly in communication with the memory 104 via data and address/control busses (not shown) to which the DMA controller 102 may also be connected.

In one embodiment, the memory 104 includes a solid state, optical, magnetic, electro-mechanical, or combinations thereof, data storage device, such as a random access memory ("RAM"), Dynamic RAM, static RAM, magnetic RAM, read only memory ("ROM"), flash memory, optical disk drive, hard disk drive, holographic memory, quantum memory or other computer data storage device, or combinations thereof, such as a hybrid hard disk, now available or later developed. In particular, the memory 104 is a data storage device having a suitable capacity, generally used as a working memory for the main processor (not shown) of the system 100, which stores data within a framework of addressable storage locations, such as a Dynamic RAM, using a regular, i.e. standardized or patterned, addressing scheme, such as an array or row/column arrangement, as will be described, a sector/cylinder/track arrangement, a content addressable scheme, or combinations thereof. The data stored at each addressable location may include one or more binary bits, bytes, half-words, words, double words, etc. and is implementation dependent. Tri-state or otherwise multi-state data storage may also be used. Further, the overall storage capacity of the memory 104 is implementation dependent and may depend on the application in which the system 100 is implemented.

While the disclosed embodiments will be described with respect to reading/retrieving data from the memory 104, it will be appreciated that requestor 106 may include devices which both read and/or write data to the memory 104 and the disclosed embodiments are applicable thereto. In one embodiment, the requestor 106 may include a data storage device, such as an optical or magnetic storage device, a memory, as described above, a suitably programmed processor such as a video processor, or pre-processor/controller therefore, a printer or pre-processor/controller therefore, a micro processor, such as the main processor (not shown) of the system 100, or a sub-unit thereof such as a co-processor or other execution unit, a wired or wireless communications/device interface or pre-processor/controller therefore, or combinations thereof. In one embodiment, the system 100 is a printer and includes a processor that converts image data received from a computer into data appropriate to drive the printer's imaging engine to cause the engine to print the image.

To clarify the use in the pending claims and to hereby provide notice to the public, the phrases "at least one of <A>, <B>, . . . and <N>" or "at least one of <A>, <B>, . . . <N>, or combinations thereof" are defined by the Applicant in the broadest sense, superceding any other implied definitions herebefore or hereinafter unless expressly asserted by the Applicant to the contrary, to mean one or more elements selected from the group comprising A, B, . . . and N, that is to say, any combination of one or more of the elements A, B, . . . or N including any one element alone or in combination with one or more of the other elements which may also include, in combination, additional elements not listed.

As was mentioned above, DMA functionality of a given computer system is typically designed to move data between the memory 104 and a requestor 106 in a manner that is optimized according to the physical and logical design/constraints of the computer's memory architecture, e.g. minimal addressable unit of data, address and data bus width, etc. However, as will be described, some requestors 106 may require data to be transferred in a way that is less optimal in terms of the physical and logical design/constraints of the computer's memory architecture but more optimal in terms of the functionality of the requestor 106. Accordingly, while the efficiency of the data transfer may be affected, the efficiency of the requestor 106 may be increased, and the net efficiency, in terms of cost, reliability, performance, etc., may be increased. The disclosed DMA controller 102 is capable of optimizing data transfers based on the needs of the requestor 106.

One example of an optimization based on a constraint of the memory architecture relates to the computer's data bus. As the bandwidth over a computer's data bus is typically limited, data is usually transferred from the memory 104 in bursts, e.g. a specific amount of data sent or received in one intermittent and/or discrete operation, so as to minimize request traffic and consumption of bandwidth due to having to repeatedly send control information to the memory 104. Sending data in sequential bursts of consecutively stored data from the memory 104 also optimizes the memory's ability to provide a large amount of data efficiently. Given a starting memory address and an amount of data to provide, the memory 104 sequentially provides the requested data without having to process multiple independent memory requests, i.e. decode multiple addresses, etc. Further, since only a single/starting memory address needs to be sent to the memory 104, bandwidth over the address/control bus is conserved.

When satisfying a request for more than one burst of data, typical DMA functionality further simplifies the data transfer by making sequential requests to the memory 104, such as by linearly incrementing a base address to the next consecutive address with each request to the memory 104, each increment being referred to as an offset and is typically the smallest addressable incremental value, thereby reducing the number of requests a requestor 106 has to make. Accordingly, for a typical memory read operation, the requestor 106 sends a memory request to the DMA functionality including a starting/base memory address and a length or amount of data needed. The DMA functionality then instructs or otherwise causes the memory 104 to provide the requested data via the data bus to the data requestor 106 in one or more bursts in sequence as they are stored/addressed in the memory 104. While this simplifies the design of the DMA functionality, the requestor 106 is forced to request and accept the data in the order provided by the memory 104 in concert with the DMA functionality.

As discussed, with burst data transfers, data is typically provided from the memory 104 as it is stored. However, a requestor 106, which is requesting particular data, may actually need the data in a different order. In one implementation, the requestor 106 may simply re-order the data once it has been received from the memory 104. This requires, however, that the requestor 106 include a buffer or other temporary data storage to contain the data received from the memory 104 so that it can be re-ordered, and further include control logic which can perform the re-ordering of the buffered data as necessary. This additional buffer and control logic adds significant complexity to the implementation of the requestor 106 which may impact cost, efficiency and/or reliability. The DMA controller 102 according to the disclosed embodiments, in contrast, provides the requested data to the requestor 106 in a requested order such that the requestor 106 does not, itself, need to re-order the data upon receipt.

For example, data representative of an image, e.g. the digital/binary representations of the individual image pixels, is typically arranged as an array of rows and columns, i.e. orthogonal row and column vectors, as arranged in the represented image. A given pixel may be represented by one or more bits or bytes of data depending on the pixel depth. A given image, or the representative image data, may actually be split into multiple of such arrays, one for each color, layer, or component, such as luminance and chrominance data, in the image. Such data may be obtained from an imaging device such as an optical scanner or digital camera and/or may be generated by the computer's processor for output to an imaging device such as a display, projector or printer. Typically, the generation of image data, such as by a scanner or digital camera, occurs row by row, each row sometimes referred to as a scan-line.

Image data is typically stored in a memory 104 in an order with respect to at least the row arrangement of the pixels as they appear in the image or as they are generated by an image data generating device, such that the data of each row occupies consecutive storage locations in the memory 104. This is so because a memory 104 is typically also arranged as an array of rows and columns of addressable storage locations, each addressable storage location holding a particular amount of data, such as one or more bytes (8 bit groupings). However, the row and column dimensions of the array of addressable storage locations may not be the same as the dimensions of the actual image/array of image data. Therefore each row of image data may occupy less or more than one row of storage locations, e.g. one row of image data may span, or be folded into, more than one row of storage locations, or one row of memory locations may contain more than one row of image data. As such, while the data of each row of image data may be stored in sequential/consecutive addressable storage locations in the memory 104, it is not necessarily so for the data of each column of image data. Further, rows of image data, or subsets thereof, may be stored in non-contiguous portions of the memory 104.

As discussed above, when the memory 104 provides this data to a requestor 106, the data is provided as it is stored, i.e. the sequential bursts are provided row by row from the memory 104, resulting, in the case of image data, that the data is provided row by row. However, the requestor 106 may desire that the image data be provided in a column by column order. For example, the requestor 106 may implement an image processing algorithm which processes each column of pixels in column order. Accordingly, the data, as provided by the memory 104, would need to be re-ordered. Further, it can be seen that to be able to re-order data provided in a row-oriented order into a column-oriented order, substantially all of the data would need to be buffered before such a re-ordering algorithm could be employed. In embodiments, as described below, where the number of columns of data far exceeds the number of rows of data, such buffering would require a substantial amount of storage on the part of the requestor 106 to perform the necessary reordering. However, where an array of data is to be provided to the requestor 106 and one dimension of the array exceeds the other, providing the data in an order which sequentially provides the shortest vectors in order, whether they are the rows or the columns, may provide for improved processing and resource efficiencies.

In one embodiment, the disclosed DMA controller 102 acts as an intermediary between the requestor 106 and the memory 104 to cause provision of the requested data in the proper order and/or re-order the data prior to its transfer to the requestor 106. In the case of data arranged as an array, the DMA controller 102 effectively transposes the array of data as it is transferred, sequentially providing each column vector of the array. This may alleviate the burden on the requestor 106 to re-order/transpose the data and reduce the costs associated therewith. Further, by centralizing the re-ordering functionality, multiple requestors 106 can take advantage of the functionality, multiplying the savings.

The disclosed embodiments are discussed with respect to re-ordering data into a column oriented arrangement where the data has a row and column arrangement and is stored in/provided by a memory 104 in a row oriented arrangement. However, it will be appreciated that other arrangements and re-orderings/transpositions may be used. For example, data stored in a column oriented arrangement may be re-ordered into a row oriented arrangement, etc.

FIG. 3 depicts an exemplary memory 104 for use with the DMA controller 102 of FIG. 1. The memory 104 stores data, such as image data, e.g. scan data for a single color obtained from an image scanner, in an arrangement of an array of rows 302 and columns 304 of addressable storage locations. Each addressable storage location is identified by the intersection of a row 302 and column 304, labeled, for illustrative purposes, as "row-identifier*total-number-of-columns (n)+column-identifier." In one exemplary embodiment, the memory 104 has a defined width of n columns 304, such as 16 columns 304, by a defined number of rows 302 (X+2), such as $2^{15}$ rows 302. Further, each addressable memory location in the memory 104 further stores one or more bits or bytes w of data, the amount, in one embodiment, being equivalent to the burst size of the memory, and in the given example, stores 16 bytes (4 words, each 32 bits). The burst size is the amount of data, e.g. pixels, that the memory 104 will automatically provide over the data bus 126 when performing a burst read operation for a particular address. Accordingly, the exemplary memory 104 stores 256 bytes ($2^8$) of data in each row 302 and provides the data in 16 byte bursts. For purposes of this example, the arrangement of the image data that will be stored in the memory 104 matches the arrangement of the addressable locations in the memory 104, i.e. each row of the image data is 256 pixels wide, also referred to as a scan line, where each pixel is represented by a one byte (eight bit) binary value, and further wherein each addressable location in the memory 104 sequentially stores 16 pixels/bytes of the row of image data. One or more rows of image data may be referred to as a "strip" or "stripe." Accordingly, in the exemplary embodiment, each burst of data comprises 16 pixels at 1 byte per pixel. Alternatively, where each pixel is represented by 2 bytes, each burst comprises 8 pixels. It will be appreciated that other arrangements of image data, such as different pixel depths, or other types of data, may be used and the memory 104 may also have alternative arrangements, burst sizes, etc. Further, as described, the arrangement of the image data may have different dimensions than the memory 104 depending on the implementation and, as such, a row of image data may span more than one row 302 of the memory 104 or, alternatively, more than one row of image data may be stored in one row 302 of the memory 104. In one embodiment, the image data represents an image having dimensions of 8.5 inches by 11 inches at 1200 dots per inch which yields an array of pixels being 10,200 pixels/columns wide by 13,200 pixels/rows tall. In this embodiment the image data is divided into strips/stripes each including a contiguous or non-contiguous subset of rows, e.g. 5-50 rows of the overall image data which may or may not overlap with another strip/stripe. In this embodiment, the memory 104 has a capacity to store one or more strip/stripes of image data. Accordingly, within each strip/stripe, the number of columns of data far exceeds the number of rows of data and it is therefore more efficient to process in a column by column fashion, as each column contains far less data to process than each row, as described elsewhere herein.

Given the image data and memory 104 arrangements above, e.g. with a burst size of 16 bytes, a typical DMA controller would read data from the memory 104 in 16 byte bursts starting with block 306, labeled "(0n+0)" and then block 312, labeled "(0n+1)" and sequentially reading out the entire row 302A before starting to read out a subsequent row 302B, in order to satisfy a request from a requestor 106 that requests data spanning multiple addressable locations. In contrast, the DMA controller 102 of the disclosed embodiments is capable of reading data from the memory 104 in 16 byte bursts starting with block 306 (0n+0) and then block 308 (1n+0) and sequentially reading out the entire column 304A before starting to read out a subsequent column 304B. Where the rows of data are stored non-contiguously in the memory 104, the disclosed DMA controller 102 is capable of skipping over the gaps 314 to read out the entire columns 304.

Referring back to FIG. 1, the DMA controller 102 includes a memory interface 128 operative to cause a memory 104 to provide at least a subset of a plurality of data stored in the memory 104 to a requestor 106. The request controller 108 includes a requestor interface/request receiver 112 operative to receive a request, comprising one or more request parameters 130, from the requestor 106 for a consecutively addressed subset of the plurality of data stored in the memory 104, either contiguously or non-contiguously, to be sequentially provided in a non-consecutive order. In one embodiment, the plurality of data itself is arranged as an array comprising a plurality of rows and columns, whereby the data of each of the plurality of rows is stored in the memory 104 in consecutively addressed locations of the rows 302 and columns 304 of the memory 104. In this exemplary embodiment, the requested non-sequential order is for the data of at least one column of the data, which corresponds to a column 304A of the memory 104, prior to the data of at least another column of the data, corresponding to a column 304B of the memory 104. The request controller 108 further includes an address generator 114 in communication with the requestor interface/request receiver 112 and a memory interface 128. The request controller 108, based on the request, is operative to cause the memory 104 to sequentially provide the requested consecutively addressed subset of the plurality of data to the requestor 106 in the non-consecutive order.

The request parameters 130 received by the requestor interface/request receiver 112 may be stored in a memory, registers/latches or other storage device. In one embodiment, the request parameters 130 include: a starting address, labeled "A1," which identifies the start of the first row 302A and column 304A of data in the memory 104 to be read; a non-contiguous starting address, labeled "A2," which identifies the starting address of first non-contiguous row 302C and column 304A of the data in the memory 104 to be read when the data to be read is stored non-contiguously in the memory 104; a first depth counter, labeled "D1," which identifies the number of rows 302 in the memory 104 comprising the first portion of non-contiguously stored data starting at address A1; a second depth counter, labeled "D2," which identifies the number of rows 302 in the memory 104 comprising the second portion of non-contiguously stored data starting at address A2; a total row count, labeled "S," which identifies the total number of rows 302 in the memory 104 to read; a column counter, labeled "L," which identifies the total number of columns 304 to read; line spacing, labeled "LS," which indicates the length of a row of data to be processed (which may be different than the length of a row 302; and burst length, labeled "BL," which indicates the length of each burst within the row of data. It will be appreciated that the nature of the request parameters 130 is implementation dependent and that more or fewer parameters may be utilized, some parameters may be combined or separated into sub-parameters, or combinations thereof. For example, where the data is only contiguously stored in the memory 104, the parameters associated with non-contiguous storage would be unnecessary. In contrast, where the data may be stored in more than two non-contiguous locations, additional parameters may be required. The exemplary DMA controller 102 supports data which is stored in either one contiguous location or across two non-contiguous locations in the memory 104, as will be described. Further, the provision of the line spacing LS and burst length BL request parameters 130 permit arrays of data to be stored in or read from the memory 104 in an arrangement out of alignment with the memory 104 array, e.g. a shorter row may be read than is stored in the memory 104.

Figure 5:
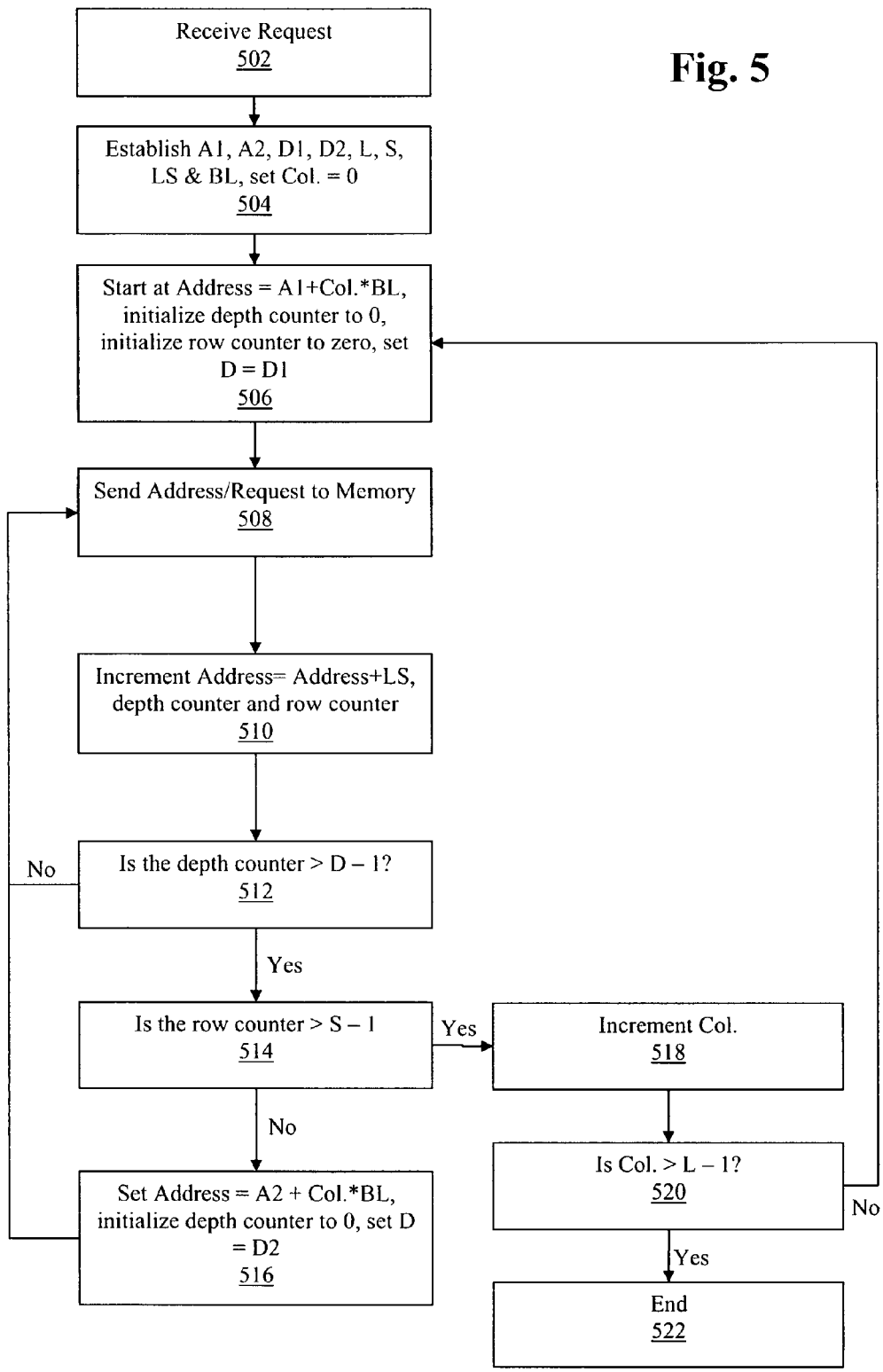
FIG. 5 depicts a flow chart demonstrating operation of the controller of FIG. 1.

FIG. 5 depicts a flow chart demonstrating exemplary operation of the DMA controller 102 of FIG. 1 for use with a consecutively addressed memory 104 operative to store a plurality of data arranged as a plurality of rows 302 and columns 304, the data of each of the plurality of rows 302 being consecutively stored in the consecutively addressed memory 104 either contiguously or across two non-contiguous portions. These operations may be controlled/implemented by program logic or computer readable program code stored in a memory and executable by a processor, hard coded, such as in a state machine or other combinational logic, or combinations thereof. The operation of the DMA controller 102 causes the consecutively addressed memory 104 to sequentially provide the data of at least one column 304A of the plurality of data stored in the memory 104. The DMA controller 102 provides, sequentially to the memory 104, each non-consecutive address of each of the data of the column 304A to cause the sequential provision of the data of that column 304A by the memory 104 prior to the data of at least one other column 304B.

In particular, the DMA controller 102 receives a request for particular data stored in the memory 104 from a requestor 106 (block 502) via the requestor interface/request receiver 112. Where the DMA controller 102 is operative to both provide the data in either row-oriented order or a column-oriented order, the received request may specify which order is desired. The received request may specify one or more of the parameters, A1, A2, D1, D2, L, S, LS and BL, described above, or they may be otherwise established and a temporary variable column counter is set to 0 (block 504). Alternatively, one or more of these parameters may be pre-programmed or hard-coded into the DMA controller 102 or derived/implied by the DMA controller 102 from other parameters or information. For example, the number of columns, L, may be dependent on the implementation of the memory 104, e.g. the actual width, logical and/or physical, of the memory 104 storage location array. In another example, the number of rows in the second non-contiguous portion, D2, may be derived from the total number of rows, S, less the number of rows in the first non-contiguous portion, D1. Further, if the request is for contiguously stored data, the values of A2 and D2 may be zero or not provided.

The read operation will begin at the starting address A1, specified as, or resolved into, a starting row 302A and column 304A address of the starting addressable location in the memory, e.g. Block 306 (0n+0), based on the base address A1 and the current values of column counter (col.) and the burst length (BL). Further, in the exemplary operation, temporary variables for a depth counter and row counter are set to zero and a temporary variable, D is set to the value of the depth of the first non-contiguous portion, D1, or the depth of the entire contiguous portion if the data is stored entirely within contiguous rows 302 (block 506). The address of the starting addressable location is sent to the memory 104 by the address generator 114 via the memory interface 128 causing the data/burst located at the given address to be provided to the requestor 106 (block 508), either via the DMA controller 102 (as shown and as will be further described below) or directly (not shown). The address is then incremented to the next row by incrementing the line spacing (LS). The temporary row and depth counters are also incremented (block 510). The depth counter is then checked to see if it has exceeded the depth, D, initially set to the number of rows in the first non-contiguous portion, less one (block 512). If the depth counter has not exceeded D−1 (or, alternatively, equal to D), the incremented address, having the incremented row component, is sent to the memory 104, the variables are incremented and the depth counter checked again (blocks 508, 510, 512).

If the depth counter has met or exceeded the depth, D, this means that at least all of the rows of the first of the non-contiguous portions have been read for the given column. This is determined by comparing the row counter to the total number of rows, S, less one (block 514). If the row counter has not exceeded S−1 (or, alternatively, equal to S), the address to read from is set to the starting address of the second non-contiguous portion in the memory 104, A2 incremented by the column counter (col.) multiplied by the burst length (BL), the depth counter is initialized to zero and the temporary variable D is set to the row depth of the second non-contiguous portion, D2 (block 516). The process then repeats (blocks 508, 510, 512, 514, 516) until all of the rows 304 in the second of the non-contiguous portions for the given column 304A have been read, as signified by the row counter exceeding the total row count, S, less one (block 514).

If the row counter exceeds S−1, then all of the rows 302 for a given column 304A have been read. Accordingly, the column counter (col.) is incremented to the next column 304B (block 518). The incremented column variable is then checked to see if it exceeds the total number of columns, L, less one (or, alternatively, equal to L) (block 520) signifying that all of the columns 304 have been read. If so, the process is finished (block 522). If all of the columns 304 have not been read, the above process is repeated.

It will be apparent that there may be other alternative processes, or modifications to the above described process, to read data from the memory in column priority. Further, error handling logic may be added to ensure that the DMA controller 102 does not attempt to read data from non-existent memory locations and to ensure that all of the data requested by the requestor 106 is provided thereto. In addition, while above described process "walks through" the memory 104 in an order orthogonal to the order in which the data is stored, it will be appreciated that non-orthogonal, e.g. oblique, orderings may also be provided.

The disclosed embodiments further relate to a DMA controller 102 for retrieving a plurality of data stored in a memory 104 in communication with the DMA controller 102, the plurality of data being characterized by a first arrangement of first and second non-parallel arrays, such as one-dimensional arrays. For example, the first arrangement may be a two dimensional array wherein the first array may be a sub-array of the two-dimensional array, such as at least one row of the two dimensional array, and the second array may be another sub-array of the two-dimensional array, such as at least one column of the two dimensional array, wherein the first and second arrays may further overlap. The first array may be orthogonal or non-orthogonal, e.g. oblique, to the second array. The plurality of data may represent a two or three dimensional image or volume, or a sequence thereof, such as a video or time-based sequence, also referred to as a four dimensional image. The plurality of data may be stored in the memory in a second arrangement that is different from the first arrangement. For example, the dimensions of the second arrangement may differ from the dimensions of the first arrangement. The first array comprises at least first and second data of the plurality of data and the second array comprises at least the first data and third data of the plurality of data. The first and third data may be stored non-contiguously in the memory 104. The DMA controller 102 includes a memory interface 128 in communication with the memory 104. The memory 104 stores the at least first and second data in consecutively addressed locations in the memory and stores the first and third data in non-consecutively addressed locations in the memory where the memory is operative to provide the at least first and second data of the first array before providing at least the third data of the second array when the memory 104 is accessed based on an address of the first data in the memory 104 and an amount of the plurality of data to provide starting from the address of the first data. The DMA controller 102 includes a requestor interface/request receiver 112 operative to receive the address of the first data and an amount of the plurality of data to provide starting from the address of the first data. The DMA controller 102 further includes an address generator 114 in communication with the requestor interface/request receiver 112 and the memory 104 and operative to access, based on the received address and amount of data, the memory and cause the memory 104 to provide the at least first data and third data of the second array before providing at least the second data of the first array.

Wherein the address generator 114 is further operative to sequentially identify the non-consecutively addressed locations of each of the first data and third data to the memory to cause the provision thereof.

The above described DMA controller 102 reads bursts of data from the memory 104 in a column priority. If the requestor 106 merely requires those bursts in column priority and/or each burst contains the required minimum data, e.g. one pixel, the data may be provided directly to the requestor 106. However, where each burst contains multiple data items, e.g. multiple pixels as described above, the bursts may further need to be deconstructed and reordered so as to be able to provide the individual data items, e.g. individual pixel data/bytes, in a column priority order to the requestor 106.

Figure 4:
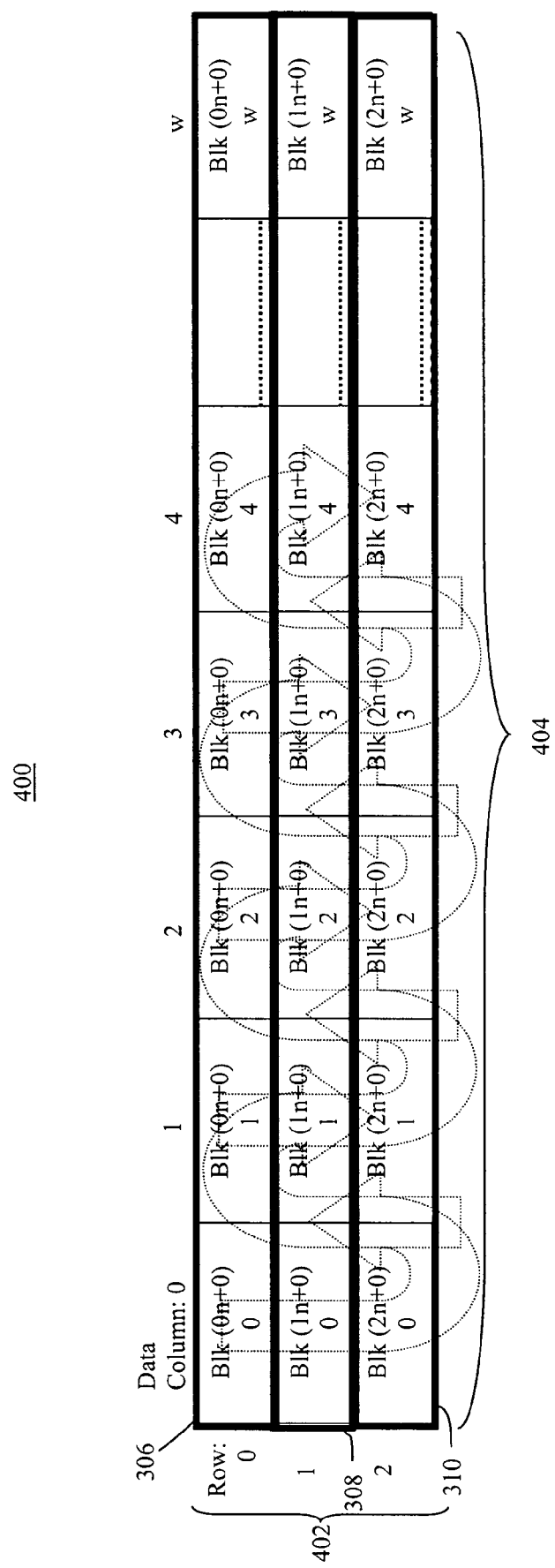
FIG. 4 depicts a subset of the memory of FIG. 3.

FIG. 4 depicts a subset 306, 308, 310 of the addressable locations of the memory 104 of FIG. 3, the subset 306, 308, 310 being from the same column 304A, as would be read out by the above described algorithm from the memory 104 depicted in FIG. 3. Each burst, or data from the addressable locations, is w bytes wide, e.g. 16 bytes, though as discussed above, other data widths/burst sizes may be used. In embodiments where each burst of data from the memory 104 further includes multiple bytes which, themselves, must be re-ordered in a column priority as described above, the bursts of an entire column 304A, i.e. the requested number of rows 302, from the memory 104 may be buffered in the DMA controller 102, such as in the vector buffer 116.

Referring back to FIG. 1, in one embodiment the DMA controller 102 further includes an intra-vector reordering processor 110 which is in communication with the memory 104 and the requestor 106. The intra-vector reordering processor 110 further includes a vector buffer 116 operative to store all of the bursts of data, e.g. pixels, of a given column 304 for the requested number of rows 302. The intra-vector reordering processor 110 further includes a control unit 118 in communication with the vector buffer 116 and operative to cause the vector buffer 116 to provide subsets of the stored data, such as individual bytes, half words, words, etc., e.g. individual pixels, in a column priority order. In an alternate embodiment, the intra-vector reordering processor 110 may also handle endianness, e.g. the ordering in which bits, nibbles or bytes are stored with respect to their numeric significance, e.g. big endian or little endian. Where the data is stored in a little endian arrangement, e.g. least significant bit, nibble or byte first, the intra-vector reordering processor 110 may cause the data to be provided in a big endian arrangement, e.g. most significant bit, nibble or byte first, or vice versa.

Figure 9:
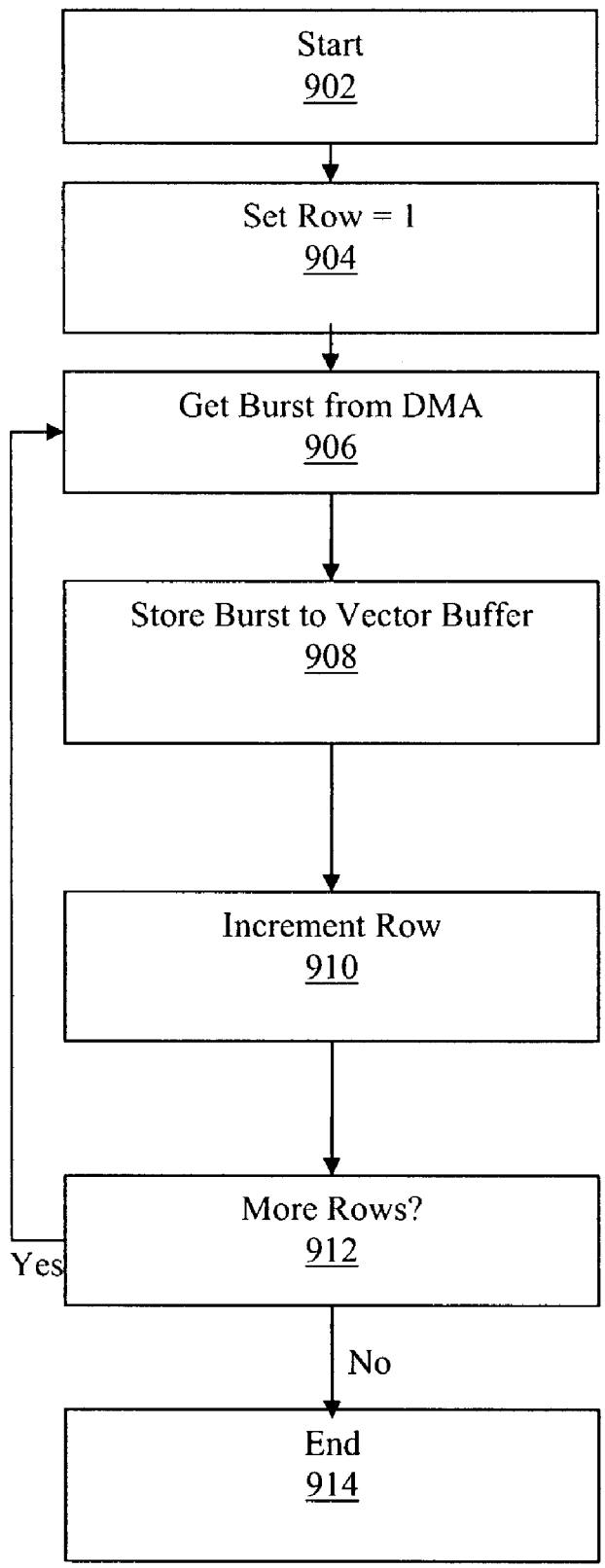
FIG. 9 depicts a flow chart demonstrating operation of storing bursts to the vector buffer of FIG. 1

In one embodiment, the bursts of data from the memory 104 are stored, as depicted in FIG. 4, in the vector buffer 116 in an arrangement 400 similar to that described above for the memory 104 and depicted in FIG. 3. For example, FIG. 9 shows a flow chart depicting exemplary operations for storing the bursts 306, 308, 310 in the vector buffer 116. These operations may be performed by control logic (not shown) which receives the bursts 306, 308, 310 and writes or otherwise directs them into the vector buffer 116. In operation, the bursts 306, 308, 310 are stored starting at the first row or memory location of the vector buffer 116 (Block 904), the bursts 306, 308, 310 are obtained (block 906), stored (block 908) and the address incremented (block 910) until all the bursts have been stored (block 912). It will be appreciated that there may be alternative algorithms to store data into the vector buffer 116 and all such algorithms are contemplated herein.

Accordingly, an algorithm similar to that of FIG. 5 may be used to read the individual bytes, or larger subsets of the data bursts, out of the vector buffer 116 in a column priority.

Figure 6:
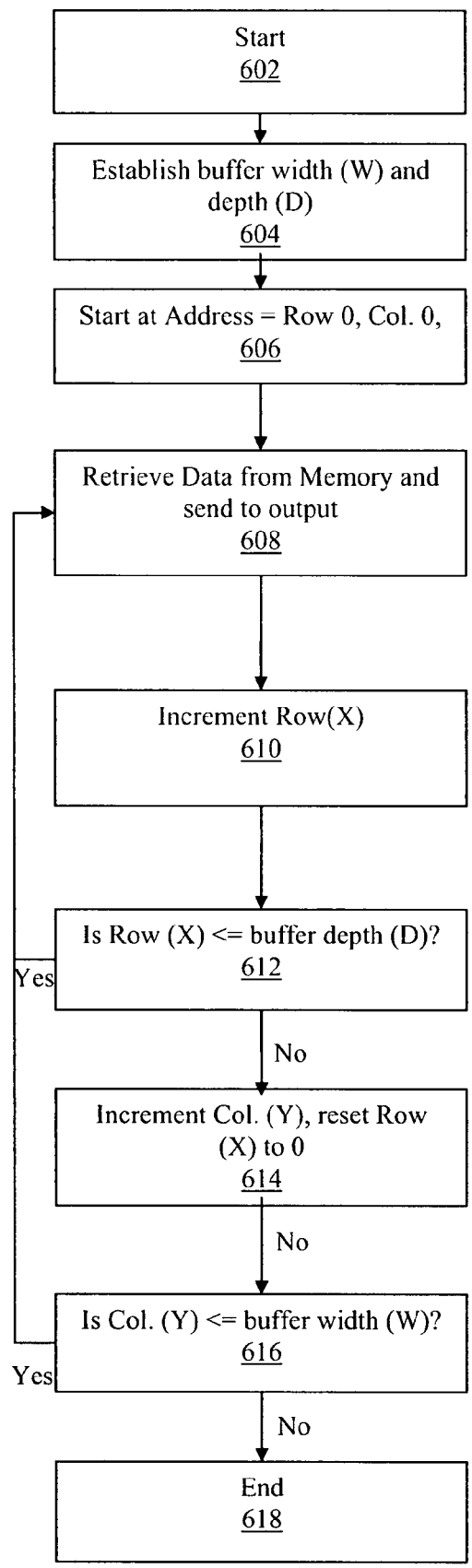
FIG. 6 depicts a flow chart demonstrating operation of the controller of FIG. 2.

However, it will be appreciated that, as the bursts are stored contiguously, and the vector buffer 116 dimensions are known or may be assumed, the algorithm for reading out the data in column priority order may be greatly simplified as shown by the flow chart of FIG. 6. For example, in operation, the buffer width (W) and depth (D) are established (block 604). In one embodiment having fixed buffer dimensions, these values are pre-defined and hard-coded. Alternatively, buffer space may be shared with other devices or processes, or be dynamically allocated from a larger memory, necessitating dynamic establishment of the buffer dimensions. In the exemplary embodiment, as shown in FIG. 4, the bursts 306, 308, 310 are stored contiguously in the vector buffer 116 starting at the first addressable location. Accordingly, the algorithm for reading out the memory begins at the address of the first column and first row of the vector buffer 116, block (0n+0) (block 606). It will be appreciated that in other vector buffer 116 arrangements, other starting addresses may be used. The data is read from the vector buffer 116 and provided to the requestor 106 (block 608). The row component of the address is then incremented (block 610) and compared against the buffer depth D (block 612). If the buffer depth has not yet been exceeded, the next data is read from the vector buffer 116 at the incremented address and provided to the requestor 106. If the incremented row address has exceeded the buffer depth D, this indicates that the entire column has been read and the column component of the address is incremented and the address component is reset to the first row (block 614). The column component is then checked against the buffer width W (block 616). If the buffer width W has not yet been exceeded, the process continues so as to read out the current column as described above. If the buffer width W has been exceeded, then the entire buffer has been read out and the process ends. It will be appreciated that the algorithm of FIG. 5, or other derivations thereof, may also be used to accomplish the desired re-ordering of the data.

Figure 2:
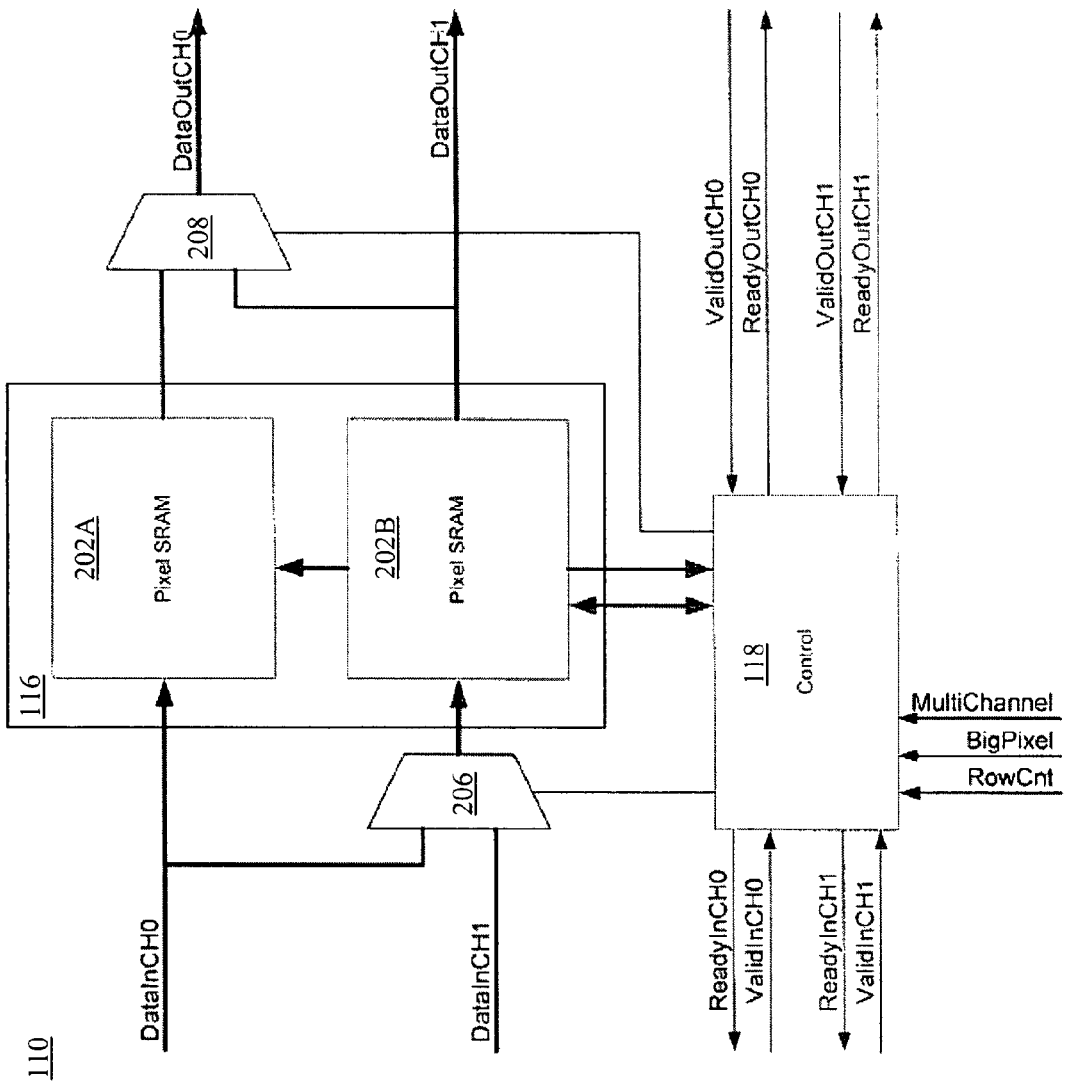
FIG. 2 depicts a block diagram of a secondary memory controller according to one embodiment.

An exemplary implementation of the intra-vector reordering processor 110 of FIG. 1 is shown in FIG. 2. In the depicted implementation, the vector buffer 116 comprises two Static RAM ("SRAM") memories 202A, 202B in communication with multiplexing logic 206, 208 so as to allow for multichannel operation. In the case of data arriving on more than one channel, operation of the SRAM memories 202A, 202B may be alternated, a.k.a. "ping-pong", to avoid operational delays.

It will be appreciated that the algorithm selected to read data out of the memory 104 or vector buffer 116 is dependent upon the implementation of the arrangement of storage locations in the memory 104 or buffer 116. For example, FIG. 7 depicts another alternative exemplary arrangement of vector buffer 116 where each addressable storage location stores two bytes of data. FIG. 7 shows the three data bursts 306, 308, 310 of FIG. 4 as they would be stored in such an arrangement. In order to read out the data in a column priority order, each addressable location would need to be read twice, selecting the desired data while masking or otherwise blocking the undesired data also stored at the particular location. FIG. 8 depicts one ordering of the retrieval of the data shown in FIG. 4 from the memory by the controller of FIG. 2. The table of FIG. 8 shows the order in which the memory must be addressed 802 and the byte enable (mask or data selection control) 804 to be used in order read the bursts 306, 308, 310 out in column priority order byte by byte 806. It will be appreciated the memory arrangement depicted in FIG. 7 may apply as well to the memory 104 and, in such an implementation, the algorithm for reading the memory 104 in column priority order would need to be suitably adjusted.

It is therefore intended that the foregoing detailed description be regarded as illustrative rather than limiting, and that it be understood that it is the following claims, including all equivalents, that are intended to define the spirit and scope of this invention.

We claim:

1. A method of retrieving a plurality of data stored in a memory, the plurality of data being characterized by a first arrangement of first and second non-parallel arrays, the first array comprising at least first and second data of the plurality of data, the second array comprising at least the first data and third data of the plurality of data, the method comprising:
   storing the at least first and second data in consecutively addressed locations in a memory;
   storing the first and third data in non-consecutively addressed locations in the memory, wherein the first and third data are non-contiguous in the memory with a gap in a location in the memory between the first data and the third data;
   receiving the address of the first data and a requested orientation from an external device; and
   causing, based on the received address of the first data, the memory to provide the plurality of data to the external device in the requested orientation such that the at least first data and third data of the second array is provided before providing at least the second data of the first array when the memory is accessed based on the address of the first data in the memory and an amount of the plurality of data to provide starting from the address of the first data.

2. The method of claim 1, wherein the first array comprises a one-dimensional array and the second array comprises a one-dimensional array.

3. The method of claim 1, the causing further comprising sequentially identifying the non-consecutively addressed locations of each of the first data and third data to the memory to cause a provision thereof.

4. The method of claim 1, wherein the first array is orthogonal to the second array.

5. The method of claim 1, wherein the first array is non-orthogonal to the second array.

6. The method of claim 1, wherein the plurality of data represents at least a portion of a two-dimensional image, or at least a portion of a three-dimensional image.

7. The method of claim 1, wherein the plurality of data is stored in the memory in a second arrangement different from the first arrangement.

8. The method of claim 1, further comprising:
   providing a data set characterized by a second arrangement of third and fourth non-parallel arrays, each being characterized by a length;
   dividing the data set into a plurality of subsets, each subset characterized by a third arrangement of fifth and sixth non-parallel arrays, the fifth array being characterized by a length substantially less than a length of the third array, and the sixth array being characterized by a length substantially a same as the length of the fourth array; and
   storing one of the plurality of subsets in the memory, the plurality of data comprising the stored subset, the first array comprising the fifth array and the second array comprising the sixth array.

9. The method of claim 1, wherein the at least first and second data are stored in consecutively addressed locations in a row in the memory.

10. The method of claim 1, wherein the at least first and second data are stored in consecutively addressed locations in a column in the memory.

11. The method of claim 1, wherein the plurality of data represents a video sequence of two or three dimension images.

12. A memory controller for retrieving a plurality of data stored in a memory in communication with the memory controller, the plurality of data being characterized by a first arrangement of first and second non-parallel arrays, the first array comprising at least first and second data of the plurality of data, the second array comprising at least the first data and third data of the plurality of data, the memory controller comprising:
- a memory interface in communication with the memory wherein the at least first and second data are stored in consecutively addressed locations in the memory and the first and third data are stored in non-consecutively addressed locations in the memory, wherein the first and third data are non-contiguous in the memory with a gap in a location in the memory between the first data and the third data;
- an address receiver operative to receive an address of the first data, an amount of the plurality of data to provide starting from the address of the first data, and a requested orientation; and
- a request generator in communication with the address receiver and the memory and operative to access the memory based on the address of the first data in the memory and the amount of the plurality of data to provide starting from the address of the first data and cause the memory to provide the plurality of data in the requested orientation such that the at least first data and third data of the second array are provided before providing at least the second data of the first array.

13. The memory controller of claim 12, wherein each of the first and second arrays comprise a one-dimensional array.

14. The memory controller of claim 12, wherein the request generator is further operative to sequentially identify the non-consecutively addressed locations of each of the first data and third data to the memory to cause a provision thereof.

15. The memory controller of claim 12, wherein the first array is orthogonal to the second array.

16. The memory controller of claim 12, wherein the first array is non-orthogonal to the second array.

17. The memory controller of claim 12, wherein the plurality of data represents at least a portion of a two-dimensional image, or at least a portion of a three-dimensional image.

18. The memory controller of claim 12, wherein the plurality of data is stored in the memory in a second arrangement different from the first arrangement.

19. The memory controller of claim 12, wherein the at least first and second data are stored in consecutively addressed locations in a row in the memory.

20. The memory controller of claim 12, wherein the at least first and second data are stored in consecutively addressed locations in a column in the memory.

21. A system for retrieving a plurality of data stored in a memory means, the plurality of data being characterized by a first arrangement of first and second non-parallel arrays, the first array comprising at least first and second data of the plurality of data, the second array comprising at least the first data and third data of the plurality of data, the system comprising:
- means for interfacing with the memory means having stored therein the at least first and second data in consecutively addressed locations in the memory means and the first and third data in non-consecutively addressed locations in the memory means, wherein the first and third data are non-contiguous in the memory means with a gap in a location in the memory means between the first data and the third data;
- means for receiving an address of the first data, an amount of the plurality of data to provide starting from the address of the first data, and a requested orientation; and
- means for accessing the memory means based on the address of the first data in the memory and the amount of the plurality of data to provide starting from the address of the first data and causing the memory means to provide the plurality of data in the requested orientation such that the at least first data and third data of the second array are provided before providing at least the second data of the first array.

22. The system of claim 21, wherein each of the first and second arrays comprise a one-dimensional array.

23. The system of claim 21, wherein the means for accessing further comprises means for sequentially identifying the non-consecutively addressed locations of each of the first data and third data to the memory means to cause a provision thereof.

24. The system of claim 21, wherein the first array is orthogonal to the second array.

25. The system of claim 21, wherein the first array is non-orthogonal to the second array.

26. The system of claim 21, wherein the plurality of data represents at least a portion of a two-dimensional image, or at least a portion of a three-dimensional image.

27. The system of claim 21, wherein the plurality of data is stored in the memory means in a second arrangement different from the first arrangement.

28. The system of claim 21, wherein the at least first and second data are stored in consecutively addressed locations in a row in the memory means.

29. A method of causing a consecutively addressed memory to sequentially provide a plurality of data non-consecutively stored in columns, the method comprising:
- receiving a request for the plurality of data, the request including a first address of a first data of the plurality of data and a requested columnar orientation;
- providing, sequentially to the memory, each non-consecutive address of each of the plurality of data in a first column, beginning with the first address, and ending with a second address in the first column, to cause the sequential provision by the memory in the requested columnar orientation, wherein the first column includes a blank space between the first address and the second address; and
- providing, subsequent to the second address in the first column, each non-consecutive address of each of the plurality of data in a second column to cause the sequential provision by the memory in the requested columnar orientation.

30. The method of claim 29, wherein each of the plurality of data is consecutively stored in consecutive addresses in a row of the memory.

31. In a consecutively addressed memory operative to store a plurality of data arranged as a plurality of rows and columns, data of each of the plurality of rows being consecutively stored in the consecutively addressed memory, a method of causing the consecutively addressed memory to provide data of at least first and second columns of the plurality of data, the method comprising:

receiving a request from a printer specifying column orientation;

providing, sequentially to the memory, each non-consecutive address of each of the data of the first column to cause the sequential provision thereof by the memory;

skipping over a blank space in the first column, wherein the blank space is consecutively addressed with data of the first column; and providing, sequentially to the memory, each non-consecutive address of each of the data of the second column to cause the sequential provision thereof by the memory.

32. The method of claim 31, wherein the data of each of the plurality of rows is consecutively stored in consecutive addresses in the memory.

* * * * *